United States Patent Office 3,420,286
Patented Jan. 7, 1969

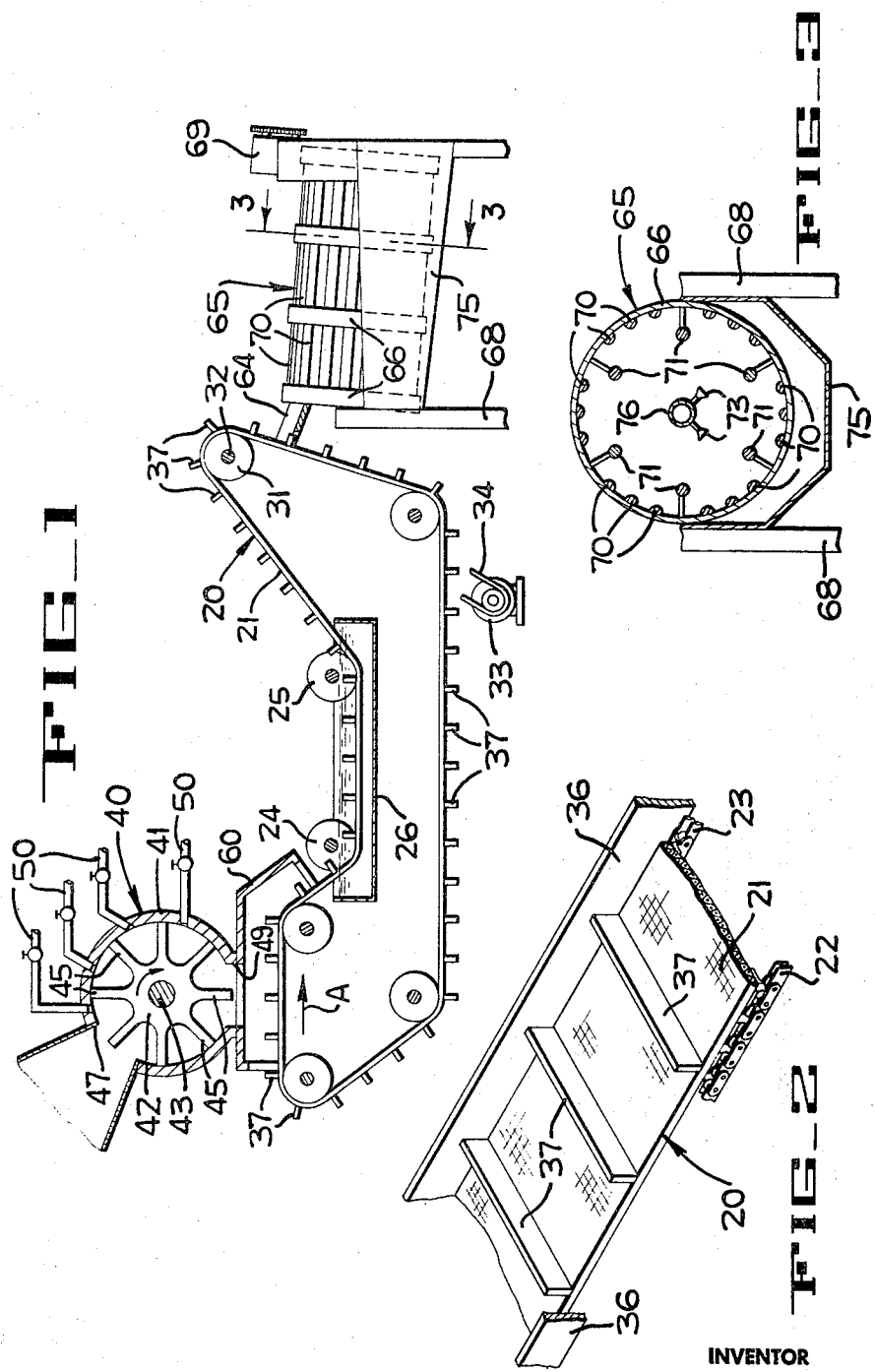

3,420,286
METHOD AND APPARATUS FOR PEELING FRUIT
Raoul Vanhoegaerden, Belsele-Waas, Belgium, assignor to International Machinery Corporation S.A., St. Niklaas-Waas, Belgium, a corporation of Belgium
Filed Nov. 23, 1965, Ser. No. 509,357
U.S. Cl. 146—231                              9 Claims
Int. Cl. A23n 7/00; B02c 11/08

ABSTRACT OF THE DISCLOSURE

A method and apparatus for peeling fruit by first heating a thin layer of the fruit for about four to six seconds by steam under pressure, then subjecting the fruit to a caustic solution at about 150° F. for about four to six minutes, and finally removing the loosened skin from the fruit by application of high pressure jets of liquid to the fruit while tumbling the fruit.

---

This invention relates to the peeling of fruit, and more particularly concerns an improved method of and apparatus for peeling vegetables such as potatoes.

When fruit and vegetables are peeled by subjecting them to the action of a caustic solution such as lye, the concentration of the solution, the temperature of the solution, and the duration of the treatment must be carefully controlled to prevent heat damage to the article being peeled. In one well known chemical peeling process the vegetables are first subjected to lye and then treated with steam. It has been found that this process results in an adequate peeling of the vegetable for some vegetables but for other vegetables, or for other varieties of the same vegetable, the process results in a heat ring being formed on the vegetable due largely to the fact that it is difficult to control the action of the lye when the lye coated potato is subjected to steam.

It is therefore an object of the present invention to provide an improved method of peeling fruit and vegetables by use of a caustic solution.

Another object is to provide a method of lye peeling without undesirable heat damage to the fruit or vegetable.

Other and further objects and advantages of the present invention will be apparent from the following description taken in connection with the accompanying drawings, in which:

FIGURE 1 is a schematic longitudinal section taken through the apparatus of the present invention.

FIGURE 2 is an enlarged diagrammatic fragmentary perspective of a portion of the apparatus of FIGURE 1.

FIGURE 3 is an enlarged diagrammatic section taken along lines 3—3 of FIG. 1.

In general, the process of the present invention comprises the steps of first subjecting the potato to steam to heat a thin outer layer of the potato, subjecting the potato to a caustic solution, and then directing water sprays against the potato to remove the loose skin therefrom.

In FIGURE 1, the mechanism chosen to illustrate the present invention includes an endless conveyor 20 which is made up of a wire mesh belt 21 secured to a pair of endless chains 22 and 23 (FIG. 2). The upper run of each chain is trained over a plurality of guide sprockets including rotatable sprockets 24 and 25 that are arranged to hold the belt submerged in lye in a tank 26 to a depth such that the potatoes on the belt are completely submerged in the lye.

A pair of sprockets 31 (one only being shown) are keyed to a shaft 32 which is driven from a variable speed motor 33 through a belt 34. The shaft 31 is rotated in a direction to cause the upper run of the belt to move in the direction of arrow A (FIG. 1).

The belt 21 may be of any apertured construction whereby it is flexible enough to follow the endless chains to which it is secured. Also, it should be made of a material that is resistant to the action of the caustic solution and must be provided with apertures through which liquid can pass.

Suitable guide walls 36 (FIG. 2) are mounted on the frame of the machine alongside the belt to guide it as it is moved along the frame. A plurality of article-advancing flights or pusher bars 37 are secured to the belt, as by capscrews, in outwardly projecting relation to the belt so that articles, such as potatoes, that are deposited on the upper flight of the belt will be positively advanced by the belt through the tank 26, and will be completely submerged in the solution as they pass through the tank.

Before being delivered to the belt 21, the potatoes pass through a rotary steamer 40 which may be of the type disclosed in the U.S. Patent to De Back No. 2,638,137. In general, the steamer comprises a cylindrical housing 41 in which a rotor 42 is mounted for rotation in a clockwise direction about an axis 43. The rotor, which is driven by an electric motor through a variable speed drive, is provided with a plurality of radially extending vanes 45, the outer ends of which slide along the inner surface of the housing in sealing engagement therewith. The vanes 45 define elongate pockets that receive potatoes from a chute or the like at an inlet opening 47 and discharge them through an outlet 49. A plurality of conduits 50 with suitable control valves are arranged to introduce steam under pressure into the housing 40 at a plurality of points between the inlet and the discharge so that the potatoes in the pockets are subjected to the heating action of the steam.

The potatoes drop from the steamer 40 onto a portion of the belt that is enclosed by a sheet metal housing 60 which may be mounted on the adjacent guide walls 36 and is effective to keep the potatoes heated until they are immersed in the lye.

The tank 26 is made of material that is resistant to the action of the lye, and preferably may be constructed of stainless steel or cast iron provided with a porcelain lining.

The potatoes are discharged from the belt 21 into a chute 64 that directs them into a rotary washer 65 of the type marketed by FMC Corporation of San Jose, Calif., under the designation of Rotary Type Washer. In general, the washer comprises a drum 66 mounted on a plurality of trunnion rollers (not shown) that are carried by a frame support structure 68. The drum, which is rotated through a pinion ring gear drive from a drive motor 69, is constructed of longitudinally extending half-oval spaced steel rods 70 (FIG. 3) held together by enclosing rings to which the rods are welded, and six equally spaced round bars 71 which form lifter flights and raise the potatoes upwardly as the drum rotates clockwise (FIG. 3). As the potatoes move through the drum, which is slightly inclined downwardly toward the discharge end, they are continually lifted by the lifter bars 71. Rotation of the drum develops a product tumbling and rubbing action which, coupled with high pressure water sprays emanating from a plurality of nozzles 73, thoroughly removes the loosened skin from the potatoes. The peeled potatoes are discharged over an adjustable baffle plate that is mounted in position adjacent the discharge end of the drum to form a dam over which the potatoes are moved. The skin and the water pass downwardly through the drum and into a drain tank 75 that is supported by the frame 68 around the lower part of the drum. The nozzles 73 are mounted at spaced intervals on a centrally supported conduit 76 that extends longitudinally through the drum and is supported in fixed position on the frame 68. The nozzles may, of course, be directed straight downwardly or at any selected angle relative to the vertical as desired.

From the foregoing description, it will be apparent that in the practice of the peeling process of this invention, the product is first heated in the steamer 40, subjected to the action of lye in the tank 26, and has its loosened skin removed in the washer 65. The specific conditions of temperature and the like may be varied to adjust the method for various fruit and vegetables and for different physical conditions of a particular fruit or vegetable. In one successful potato peeling operation, steam pressures in the range of from 43–80 p.s.i. gauge were used in the steamer and the potatoes were moved through the steamer in a time range of from 6 to 9 seconds. The lye solution had a concentration of 17% and a temperature of 150° F., and the potatoes were moved through the bath in from 4 to 6 minutes. The water sprays from the nozzles 73 were at approximately 50 p.s.i. gauge.

It should be noted that with this method each potato is exposed to steam in the steamer for only a few seconds. Accordingly, it has no chance to pick up a large quantity of heat, but only enough to cause an outer thin layer of predetermined thickness to be heated to approximately 212° F. When each potato drops into the 150° F. lye, the outer layer of the potato is not further heated because the lye is colder than the exterior of the potato. On the other hand, when a lye coating is placed on the potato, it is not cooled because the surface of the potato is relatively hot. Thus, the viscosity of the lye film is not adversely thickened, and the lye can proceed to effectively attack the peel. It has been found that the loss of product due to chemical peeling has been decreased when this method is used, and it is believed that this advantageous result may be due to the fact that only a thin outer layer of the potato is heated and, as a result, the action of the lye on the relatively cool undersurface of the potato can be controlled. As previously mentioned, in processes which involve a long submersion in lye followed by a steam treatment, the potato is heated to a considerable depth while in the lye, resulting in a rapid and deep peeling action when the lye-treated potato is further heated by being subjected to steam.

Having thus described the invention, what is claimed as new and desired to be protected by Letters Patent is:

1. The method of peeling fruit comprising subjecting all surfaces of the fruit to a heating medium under super-atmospheric pressure to raise the temperature of a thin outer layer of the fruit, subjecting the heated fruit to the action of caustic solution for a predetermined time to disintegrate the peel, and removing the loosened skin from the fruit by directing high pressure streams of cool liquid against the fruit while simultaneously rotating and tumbling the fruit.

2. The method of peeling fruit comprising subjecting the fruit to a heating medium to raise the temperature of a thin outer layer of the fruit, subjecting the heated fruit to the action of caustic solution for a predetermined time to disintegrate the peel, and removing the loosened skin from the fruit, said heating of the thin outer layer of the fruit being carried out by subjecting the fruit to the action of steam, said treatment with steam being carried out in about nine seconds and the pressure of the steam being in the range of from 43 to 80 p.s.i. gauge.

3. The method of peeling fruit comprising subjecting the fruit to a heating medium to raise the temperature of a thin outer layer of the fruit, subjecting the heated fruit to the action of caustic solution for a predetermined time to disintegrate the peel, and removing the loosened skin from the fruit, said caustic solution being maintained at about 150° F.

4. The method of peeling fruit comprising subjecting the fruit to a heating medium to raise the temperature of a thin outer layer of the fruit, subjecting the heated fruit to the action of caustic solution for a predetermined time to disintegrate the peel, and removing the loosened skin from the fruit, said caustic solution being maintained at about 150° F. and having a concentration of approximately 17%.

5. The method of peeling fruit comprising subjecting the fruit to a heating medium to raise the temperature of a thin outer layer of the fruit, subjecting the heated fruit to the action of caustic solution for a predetermined time to disintegrate the peel, and removing the loosened skin from the fruit, said thin outer layer of the fruit being raised to a temperature of about 212° F. for a few seconds, and the heated fruit being processed in lye having a temperature of about 150° F. for from 4 to 6 minutes.

6. The method of claim 5 wherein the skin removal step is carried out by subjecting the fruit to the action of jets of pressurized liquid to rapidly cool the fruit and remove the disintegrated skin.

7. Apparatus for peeling fruit comprising heating means for subjecting the fruit to the action of a heating medium of predetermined temperature for a predetermined interval of time, skin-loosening means for receiving the heated fruit from said heating means and subjecting the fruit to the action of a caustic solution at a temperature substantially less than said predetermined temperature to loosen the skin, and means for removing the loosened skin from the fruit, said heating means being a rotary steamer having means for moving the fruit through the steamer in from 4 the 6 seconds to raise the temperature of a thin outer layer of the fruit to a predetermined value, and said skin-loosening means being a lye solution at about 150° F., further characterized by means for subjecting the loosened skins to the action of pressurized jets of liquid to remove the skins from the body of the fruit.

8. The method of claim 1 wherein the fruit is completely submerged while being subjected to the caustic solution whereby all surfaces of the fruit are equally subjected to the solution.

9. An apparatus according to claim 7 wherein means are provided to tumble the fruit while the fruit is being subjected to the action of said pressurized jets of liquid to aid in removing the skins from the fruit.

References Cited

UNITED STATES PATENTS

| 1,396,268 | 11/1921 | Dunkley | 146—47 X |
| 1,427,270 | 8/1922 | Dunkley | 146—47 X |
| 2,616,819 | 11/1952 | Ford | 146—47 X |

JAMES M. MEISTER, *Primary Examiner.*

U.S. Cl. X.R.

146—232, 47